United States Patent [19]
Bienert

[11] 3,822,912
[45] July 9, 1974

[54] CABLE DRIVE AND GUIDE FOR AUTOMOBILE SLIDING ROOFS

[75] Inventor: Horst Bienert, Gauting, Germany

[73] Assignee: Webasto-Werk W. Baier KG, Stockdorf, Germany

[22] Filed: Apr. 3, 1973

[21] Appl. No.: 347,369

[30] Foreign Application Priority Data
Apr. 4, 1972   Austria .............................. 2886/72

[52] U.S. Cl. .......................................... 296/137 G
[51] Int. Cl. ............................................ B60j 7/00
[58] Field of Search ......... 296/137 E, 137 F, 137 G, 296/137 H, 137 R; 49/456

[56]           References Cited
             UNITED STATES PATENTS
2,985,483   5/1961   Bishop et al. ................... 296/137 G
3,075,807   1/1963   Werner ........................... 296/137 G
3,507,537   4/1970   Kouth et al. ..................... 296/137 F FOREIGN PATENTS OR APPLICATIONS
911,443   8/1959   Great Britain ................. 296/137 E

*Primary Examiner*—Allen N. Knowles
*Attorney, Agent, or Firm*—Joseph A. Geiger

[57]              ABSTRACT

A cable drive and guide system for rigid automobile sliding roofs where the roof opening frame includes on each side a rain channel, a longitudinal ridge profile, and a guide profile for the push-pull-type drive cable, a removable upper guide profile forming part of the sliding roof guide on one side of the ridge profile and part of the drive cable guide on the other side of the ridge profile.

12 Claims, 4 Drawing Figures

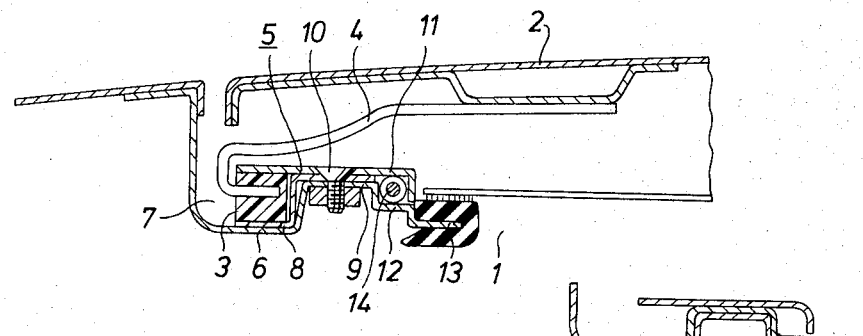
Fig.1
Fig.3
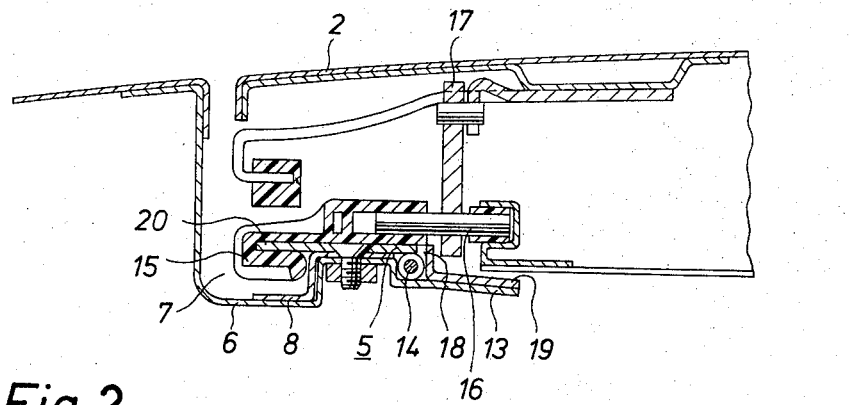
Fig.2
Fig.4

CABLE DRIVE AND GUIDE FOR AUTOMOBILE SLIDING ROOFS

BACKGROUND OF THE INVENTION

1. Field of the Invention

The present invention relates to drive means and guide means for automobile sliding roofs, and in particular to cable drives for such sliding roofs where the cables are guided inside longitudinal profiles along the frame bordering the roof opening.

2. Description of the Prior Art

The use of cables for the movement of automobile sliding roofs is known in the prior art. However, past solutions suggest the use of guide profiles of plastic material which enclose the cables almost completely over their entire effective lengths. These cable guides have the shortcoming that the cables have to be inserted into the guides over a considerable length, rendering the assembly operation difficult. Furthermore, because of the expensive production tools required, and because of the use of plastic material, these guides represent costly parts. It has therefore already been suggested to omit these special guides and to position the cables in the rain channels of the roof opening frame by means of special positioning profiles. Although this solution offered a considerable reduction in cost, it increased the difficulties of assembly to a certain extent, because of reduced accessibility of the cables.

On the forward section of the roof opening frame, where the sliding roof is not guided, prior solutions have suggested a cable guide which is composed of two plastic profile halves. Although assembly was somewhat simplified through the use of this split guide profile, the side portions of the roof opening frame still required extruded one-piece plastic profiles as cable guides.

SUMMARY OF THE INVENTION

It is a primary objective of the present invention to suggest a cable drive and guide system for automobile sliding roofs where the above-mentioned shortcomings are eliminated, the novel guide means being inexpensive in production and easy to mount on the car roof. An additional objective relates to the simplicity and operational reliability of the sliding roof drive and guide means.

The invention proposes to attain the objective by suggesting a cable drive for the sliding roof which includes no more than one cable on each longitudinal side of the sliding roof, the guide channels for the cables being provided in part by profile portions of the roof opening frame and in part by cover profiles which are removably attached to the opening frame. The profile parts which cooperate to form this cable guide are preferably so arranged that each one of them encloses 40 per cent of the cable circumference.

The solution suggested by the present invention not only facilitates the assembly and removal of the cables — and consequently of the entire sliding roof assembly — to a considerable extent, it is also of a design which only requires very simple and inexpensively produced sheet metal profiles. A still further advantage of the invention is that it reduces the overall height of the sliding roof profile to a minimum. It also provides an effective and reliable guide for the sliding roof with a minimum of operational wear, and hence no wear-induced rattling.

A preferred embodiment of the invention suggests a cable guide channel which encloses less than the entire cable circumference in the displacement range of the cable connection. It further suggests that those profile portions of the guide assembly which are subject to frictional wear are made of stainless steel so as to minimize frictional wear and at the same time provide effective corrosion resistance. Instead of stainless steel, it is also possible to use plastic overlays, plastic spray coatings, or the like. It is thus not necessary to make the entire roof opening frame out of an expensive material, a fact which represents a considerable cost advantage.

BRIEF DESCRIPTION OF THE DRAWING

Further special features and advantages of the invention will become apparent from the description following below, when taken together with the accompanying drawing which illustrates, by way of example, several embodiments of the invention, represented in the various figures as follows:

FIG. 1 represents an elevational cross section perpendicular to the vehicle center axis, showing a portion of the roof opening frame and a cooperating lateral portion of the sliding roof assembly in an embodiment of the invention;

FIG. 2 shows a similar cross section through the rear portion of the sliding roof assembly, the latter including a lifting linkage;

FIG. 3 shows a modified version of the guide profiles of FIG. 1 in a transverse cross section; and FIG. 4 shows a cross section of the modified guide profiles in the area of the cable connection.

DESCRIPTION OF THE PREFERRED EMBODIMENTS

As can be seen in FIG. 1, the stationary roof portion has an opening 1 inside which is arranged a movable sliding roof assembly 2. The front portion of the sliding roof assembly is supported by two guide shoes 3 which are connected to the roof panel itself by means of connection links 4. The drawing and the description following hereafter refer to only one side of the roof assembly. It should be understood, of course, that corresponding parts are suggested on both sides of the sliding roof. The panel guide shoe 3 is positioned between a horizontal upper guide profile 5 which extends partially over the rain channel 7 of the roof opening frame, a Z-shaped, lower guide profile 8 being positioned in the bottom portion 6 of the rain channel 7.

The upper guide profile 5 is removably attached to a longitudinal ridge 9 of the roof opening frame, the ridge 9 being parallel to and spaced inwardly from the rain channel 7. Screws 10, which position the upper guide profile 5 on ridge 9, can be quickly and conveniently removed to provide access to the drive cable and guide means. The upper profile 5 further includes a downwardly oriented ledge 11 on its inner overhang from ledge 9 which cooperates with an offset wall portion 12 of the roof opening frame adjacent to its longitudinal ridge 9 to form a guide channel for the push-pull-type drive cable 14 of the sliding roof drive.

FIG. 3 separately shows a modified version of the profiles which constitute the guides for the guide shoe 3 and for cable 14, the lower guide profile 8 being inwardly extended and downwardly offset to form a profile portion 12 which cooperates with the ledge 11 of the upper guide profile 5 to provide the cable guide channel. These two guide profiles can be conveniently manufactured of stainless steel sheet.

FIG. 2 shows the rear portion of the sliding roof assembly and the corresponding portions of the roof opening frame and guide profiles, the parts corresponding to those shown in FIG. 1 carrying the same reference numerals. This portion of the sliding roof assembly includes the drive connection between cable 14 and the sliding roof 2, the connection being combined with a rear carriage 15 which engages the upper guide profile 5. Within the movement range of the rear drive carriage 15 the upper guide profile 5 is shortened to cover only a portion of cable 14, in order to allow for the longitudinal motion of the cable connection 18. The drive carriage 15 further includes a horizontal inwardly extending pivot pin 16 which carries a lifting link 17 connected to the rear portion of roof panel 2. FIG. 2 also shows an angle profile 19 forming the inner lateral portion of the cable guide channel in the length portion in which the downwardly oriented ledge 11 of the upper guide profile is cut away to accommodate the cable connection 18. The rear drive carriage 15 is preferably guided on the upper guide profile 5 in the area of its outer overhang 20.

In FIG. 4 is shown a different cross section of the modified version of the guide profiles of FIG. 3, the lower guide profile 8 being still further extended to include an upstanding ledge 21 which cooperates with the cut-away upper guide profile 5 to provide the cable guide channel with the necessary opening for the cable connection 18. The angle profile 19 of FIG. 2 is not necessary in this case.

It should be understood, of course, that the foregoing disclosure describes only preferred embodiments of the invention and that it is intended to cover all changes and modifications of these examples of the invention which fall within the scope of the appended claims.

What is claimed is:

1. A cable drive and guide system for rigid automobile sliding roofs comprising in combination:
    a stationary roof portion having a generally rectangular opening therein;
    a roof opening frame fixedly attached to the stationary roof portion and bordering the latter on at least its longitudinal sides; the longitudinal portions of the frame having a cross-sectional profile which includes a downwardly extending frame profile portion and an adjoining inwardly extending frame profile portion reaching toward the sliding roof assembly at a distance below the stationary roof portion;
    a sliding roof assembly with a sliding roof panel of an outline corresponding to that of the roof opening, the sliding roof assembly being arranged for opening and closing through longitudinal motion relative to the stationary roof portion in a known manner;
    means for driving the sliding roof assembly to produce the opening and closing motions, the driving means including two push-pull-type drive cables, one on each side of the sliding roof assembly;
    means for connecting the rear portion of the sliding roof assembly to the drive cables;
    means for longitudinally guiding the drive cables relative to the roof opening frame; and
    means for longitudinally guiding the sliding roof assembly relative to the roof opening frame;
    the drive cable guide means including a stationary longitudinal guide channel for each drive cable which substantially encloses the cable, one portion of the guide channel profile being constituted by the roof opening frame, another portion of the profile being constituted by an upper guide profile in the form of a removable cover part which is fastened to the inwardly extending frame profile portion.

2. A device as defined in claim 1, wherein:
    the removable upper guide profile of the drive cable guide means also constitutes part of the sliding roof guide means by forming at least part of a stationary longitudinal guide.

3. A device as defined in claim 1, wherein:
    the stationary longitudinal guide channel of the drive cable guide means is so arranged that the profile portion constituted by the roof opening frame and the profile portion constituted by the removable upper guide profile each enclose at least 40 per cent of the cable circumference.

4. A device as claimed in claim 1, wherein:
    the inwardly extending profile portion of the roof opening frame includes:
    a rain channel adjacent the downwardly extending frame profile portion;
    a longitudinal ridge profile spaced a distance inside the downwardly extending frame profile portion; and
    a lower cable guide profile which forms that part of the drive cable guide channel which is constituted by the roof opening frame, the lower guide profile being arranged inwardly adjacent the ridge profile.

5. A device as defined in claim 4, wherein:
    the upper guide profile of the drive cable guide means is removably attached to the longitudinal ridge profile of the roof opening frame, the upper guide profile being larger than the width of the ridge profile so as to form an overhang on both sides thereof, thereby constituting at least part of the sliding roof guide means on its outer overhang on the side of the rain channel, while constituting the earlier-mentioned portion of the drive cable guide channel on its inner overhang.

6. A device as defined in claim 5, wherein:
    the inwardly extending portion of the roof opening frame further includes:
    an overlay in at least the area of the lower cable guide profile, the overlay being adapted for frictional engagement by the moving drive cable.

7. A device as defined in claim 6, wherein:
    the overlay also reaches over the longitudinal ridge profile and covers part of the frame profile portion between the rain channel and the ridge profile, the latter part of the overlay forming part of the sliding roof guide means.

8. A device as defined in claim 7, wherein:
    the overlay is a shaped sheet profile of a material different from that of the roof opening frame.

9. A device as defined in claim 5, wherein:
    the stationary longitudinal guide channel of the drive cable guide means includes an opening for the sliding roof connecting means in the length portion covered by longitudinal movement of the connecting means, said opening being provided in the upper guide profile.

10. A device as defined in claim 9, wherein:

the upper guide profile further includes a downwardly extending ledge on its inner overhang which forms a portion of the drive cable guide channel, the ledge and a narrow portion of the overhang being cut away in the length portion covered by the longitudinal movement of the connecting means; and the lower cable guide profile of the roof opening frame includes an angle profile with an upstanding ledge which covers that portion of the drive cable guide channel in which the ledge of the upper guide profile is cut away.

11. A device as defined in claim 9, wherein:

the upper guide profile further includes a downwardly extending ledge on its inner overhang which forms a portion of the drive cable guide channel, the ledge and a narrow portion of the overhang being cut away in the length portion covered by the longitudinal movement of the connecting means;

the inwardly extending portion of the roof opening frame further includes a shaped overlay profile which covers at least the longitudinal ridge profile and the lower cable guide profile; and the shaped overlay includes in the area of the cable guide profile an upstanding ledge which covers that portion of the cable guide channel in which the ledge of the upper guide profile is cut away.

12. A device as defined in claim 11, wherein:

the upper guide profile and the overlay profile are both removably attached to the roof opening frame.

* * * * *